United States Patent [19]
Freda

[11] 3,724,596
[45] Apr. 3, 1973

[54] BEARING LUBRICATOR
[76] Inventor: John F. Freda, 504 Division Avenue, Willow Grove, Pa. 19090
[22] Filed: July 22, 1971
[21] Appl. No.: 165,293

Related U.S. Application Data
[63] Continuation of Ser. No. 798,354, Feb. 11, 1969, abandoned.

[52] U.S. Cl. .............................. 184/1 D, 184/105 R
[51] Int. Cl. ......................... F16n 7/14, F16n 11/10
[58] Field of Search ..................... 184/1, 1 D, 105 R

[56] References Cited

UNITED STATES PATENTS

| | | | |
|---|---|---|---|
| 2,891,634 | 6/1959 | Becker | 184/1 D |
| 2,886,132 | 5/1959 | Gittinger et al. | 184/1 D |
| 3,365,024 | 1/1968 | Freda | 184/1 D |
| 2,707,528 | 5/1955 | Mulvanity et al. | 184/1 D |
| 2,839,160 | 6/1958 | Wright | 184/1 D |
| 3,048,236 | 8/1962 | Larke et al. | 184/1 D |

Primary Examiner—Manuel A. Antonakas
Attorney—Frederick J. Olsson

[57] ABSTRACT

Lubricating equipment for supplying grease to a tapered roller bearing assembly, such an assembly comprising the inner race, the bearings and the cage. The equipment includes a horizontal support surface to engage the cage, an annular groove forming a ring of grease which is caused to rise upwardly into the bearings and a cavity inboard of the groove, the wall of which engages the inner race and positions the assembly so that the bearings are presented to the groove so that the ring of grease rises up inbetween and around the bearings.

14 Claims, 10 Drawing Figures

PATENTED APR 3 1973

PATENTED APR 3 1973
3,724,596
SHEET 4 OF 4
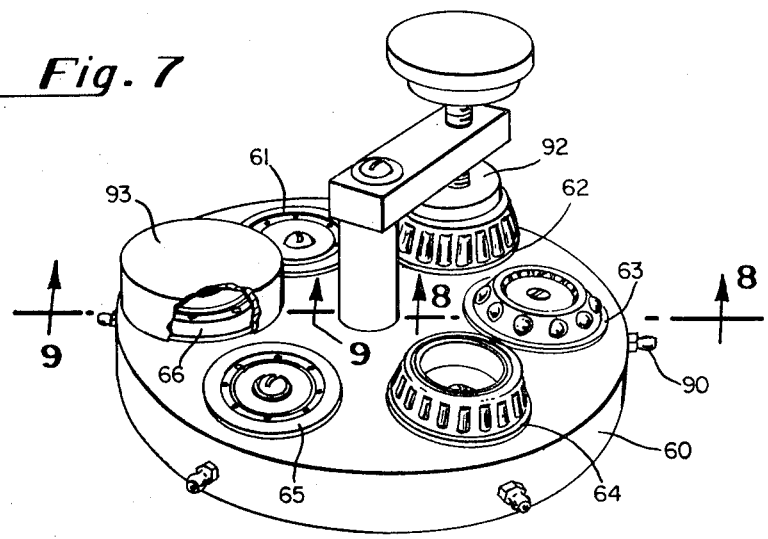
Fig. 7
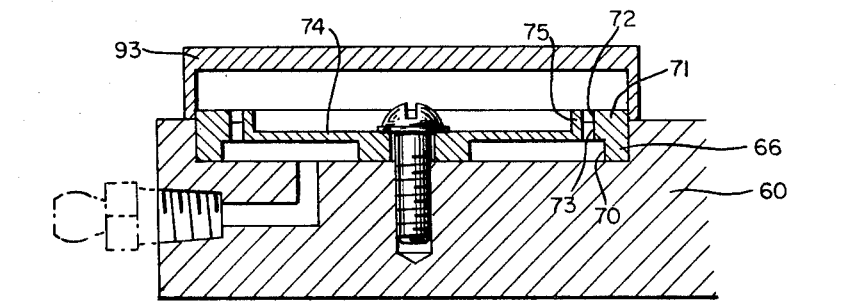
Fig. 8
Fig. 9

BEARING LUBRICATOR

This application is a continuation of my application Ser. No. 798,354 filed Feb. 11, 1969 and entitled Improved Bearing Lubricator and now abandoned.

This invention relates to lubrication equipment and in particular relates to lubricating equipment especially adapted to lubricate tapered roller bearings.

The invention contemplates equipment which supports an assembly comprising the inner race, tapered bearings and the cage in a position so that grease can be quickly and positively injected between and around the bearings.

One object of the invention is to provide equipment especially constructed to mount an assembly of the kind in question so as to present the bottom of the bearings to an annular groove forming a ring of grease which is caused to rise up in-between and around the bearings.

Another object of the invention is to provide equipment especially constructed to mount an assembly of the kind in question so as to present the bottom of the bearings to an annular groove supplying a ring of grease which is caused to rise up in-between and around the bearings, the outer wall of the cage extending partially across said groove and operating to direct the grease into the bearings.

Another object of the invention is to provide lubricating equipment alternatively adaptable to lubricate assemblies of different sizes, the equipment being constructed to support an assembly of one size for lubrication or alternatively to mount an insert which in turn will support an assembly of larger or smaller size for lubrication.

Another object of the invention is to provide lubricating equipment which can be custom fitted to the particular kind, size or number of bearings normally processed, the equipment comprising a plurality of inserts which are mounted on a common frame and respectively adapted to support different size assemblies either in linear side-by-side relationship or disposed in a generally circular fashion, the inserts being individually connectible with the source of grease.

The preferred forms of the invention will be explained below in connection with the following drawings wherein:

FIG. 7 is a perspective view of lubricating equipment especially adapted for lubricating smaller size bearing assemblies;

FIG. 8 is a view taken along the lines 8—8 of FIG. 7; and

FIG. 9 is a view taken along the lines 9—9 of FIG. 8.

Figure 1:
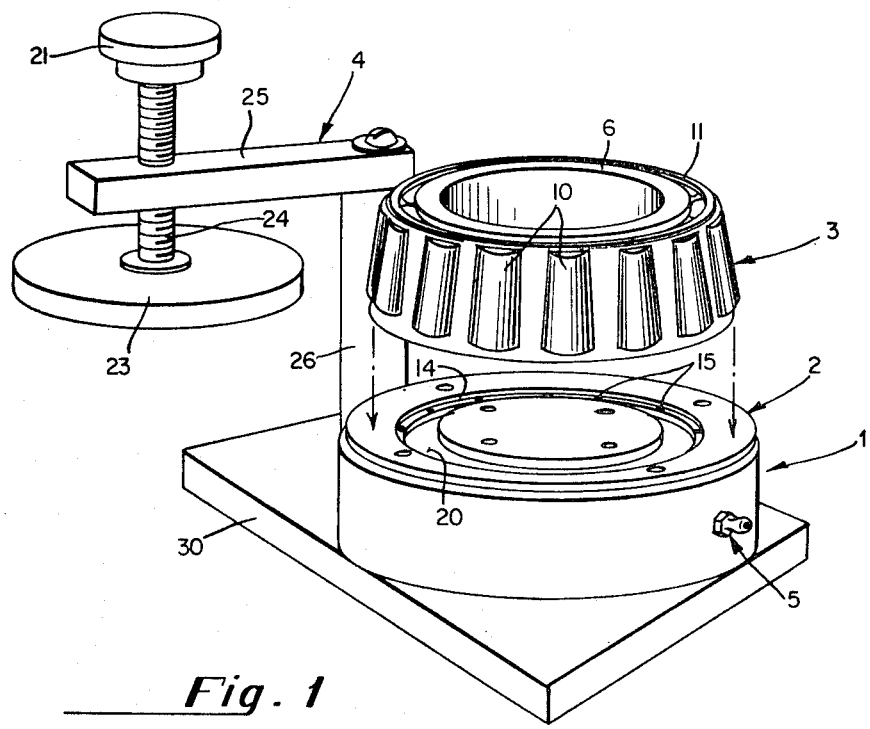
FIG. 1 is a partially exploded perspective view of lubricating equipment constructed in accordance with the invention and particularly adapted for lubricating large tapered roller bearing assemblies.
Figure 2:
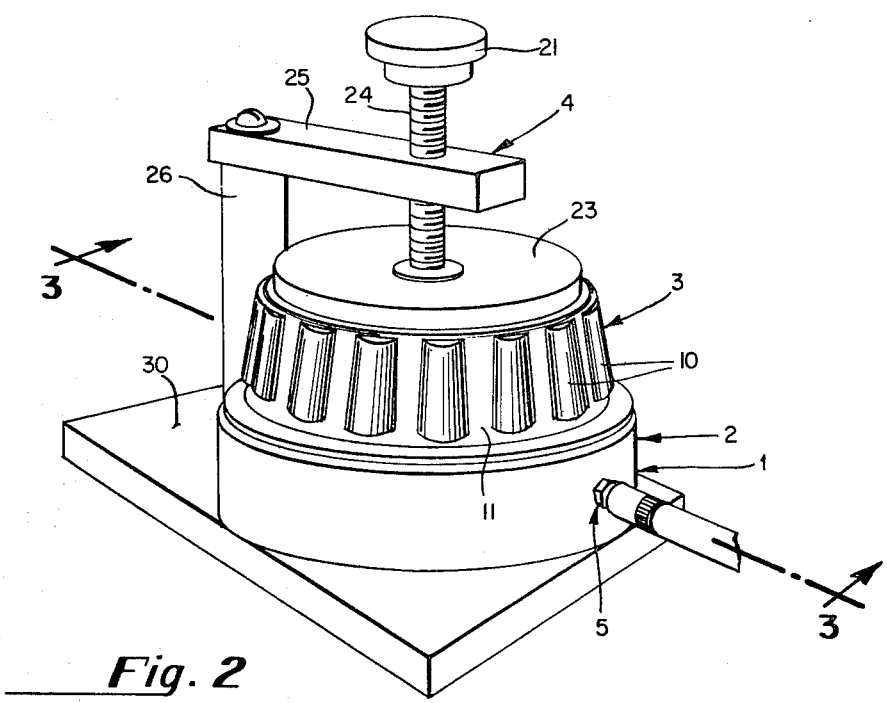
FIG. 2 is a perspective view of the equipment of FIG. 1 where the bearing assembly is in place for the greasing operation.

In FIGS. 1 and 2 the frame 1 has a top area 2 to support the tapered roller bearing assembly 3 for the greasing operation. As indicated in FIG. 2 the bearing is held in position by the hold-down means 4. The lubricating grease enters the frame 1 through the fitting 5 from whence it goes up into the bearing assembly.

The tapered roller bearing assembly as used herein means an assembly including the inner raceway, the bearings and the cage. Referring to the bearing assembly 3, the inner raceway is indicated at 6, the bearings at 10 and the cage at 11.

Figure 3:
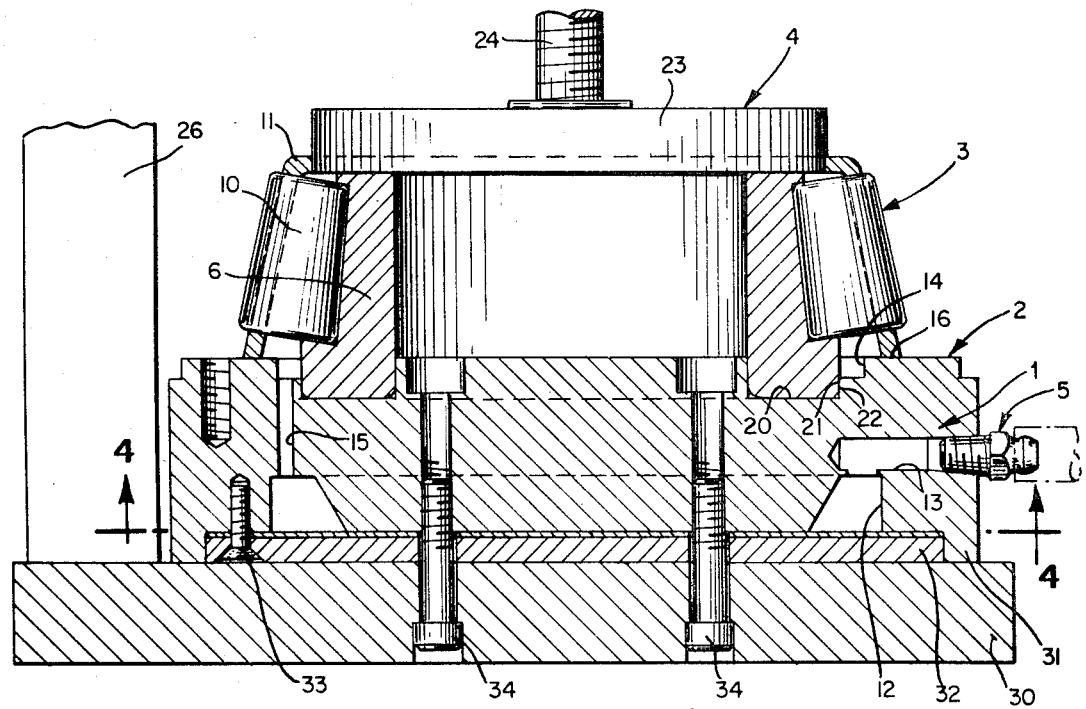
FIG. 3 is a sectional elevational view taken along the line 3—3 of FIG. 2.

Referring to FIG. 3 it will be seen that the frame 1 has an annular cavity 12 which is connected with the fitting 5 via the passage 13, the cavity 12 forms a grease manifold.

The top area 2 has an annular groove 14 formed thereon. The frame has a plurality of vertically extending passages 15 connected between the manifold 12 and groove 14. The passages 15 conduct grease from the manifold to the groove.

The top area 2 also includes a flat annular surface 16 which is disposed outwardly of the groove 14. The support surface 16 engages the cage 11 to support the assembly for lubrication.

Inboard of the groove 14 is a cavity 20 which accepts the race 6 of the bearing. The wall 21 of the cavity engages the outer wall 22 of the race 6 to position the assembly laterally and present the bearings 10 to the groove 14 whereby to receive grease therefrom.

Grease from the fitting 5 is under pressure and fills up the manifold 12 and moves up through the passages 15 to fill the groove 14. As grease continues to flow it tends to form an annular ring which moves upwardly into and between the bearings 10.

It will be observed that the outer wall 22 of the inner race extends partially across the groove 14 and operates to direct grease from the groove upwardly into the bearing.

The hold-down mechanism 4 comprises a plate 23 which fastened to the threaded shank 24 threadingly engaged with the arm 25 rotatably mounted on the post 26. By turning the knob 27 the plate 23 can be moved up and down.

With reference to FIG. 3 it will be observed that the diameter of the plate 23 is made such that the plate makes a close fit with the cage 11 and engages the top of the race 6. The plate fixedly holds the assembly and spans the space between the cage and the race to form a grease seal. In using equipment having a grease seal as described, the time when the bearing is fully lubricated can be determined by that grease will begin to ooze outwardly from the topmost part of each bearing.

Further commenting on the structure of FIG. 3 it will be seen that the frame comprises the base 30, the disc 31. Between the base 30 and the disc 31 is the seal 32 which closes off the manifold 12. The seal is held in place by the screws 33 and the base 30 and disc 31 are held by the screws 34.

Figure 6:
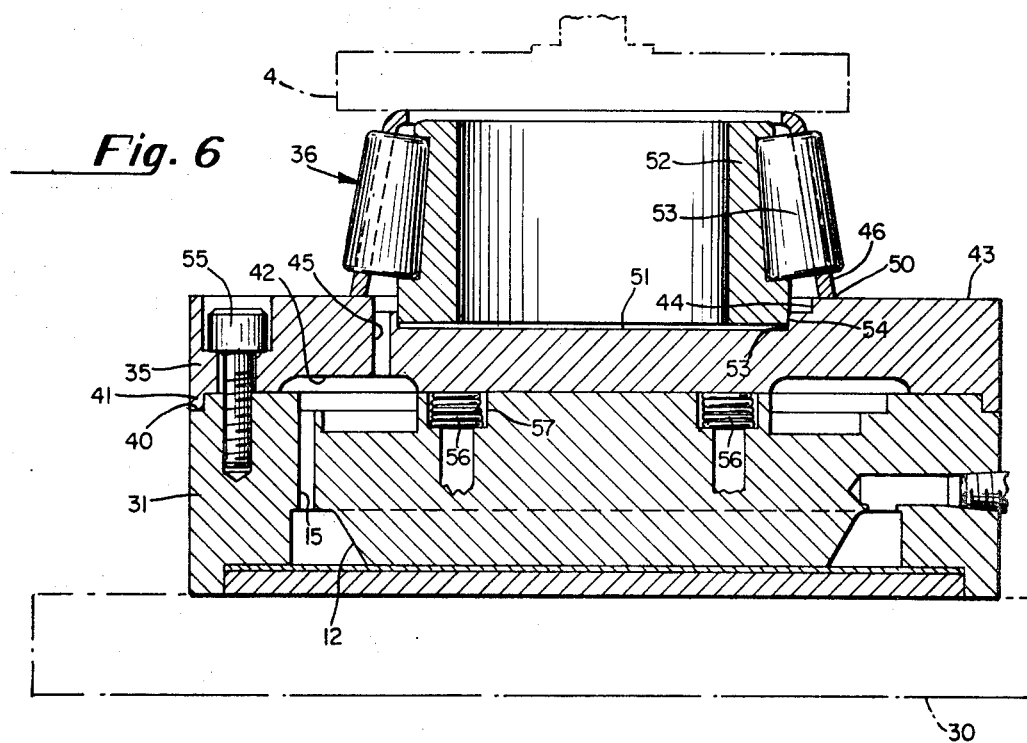
FIG. 6 is a sectional elevational view of the assembly of FIG. 5 with the bearing assembly in position for the greasing operation.
Figure 5:
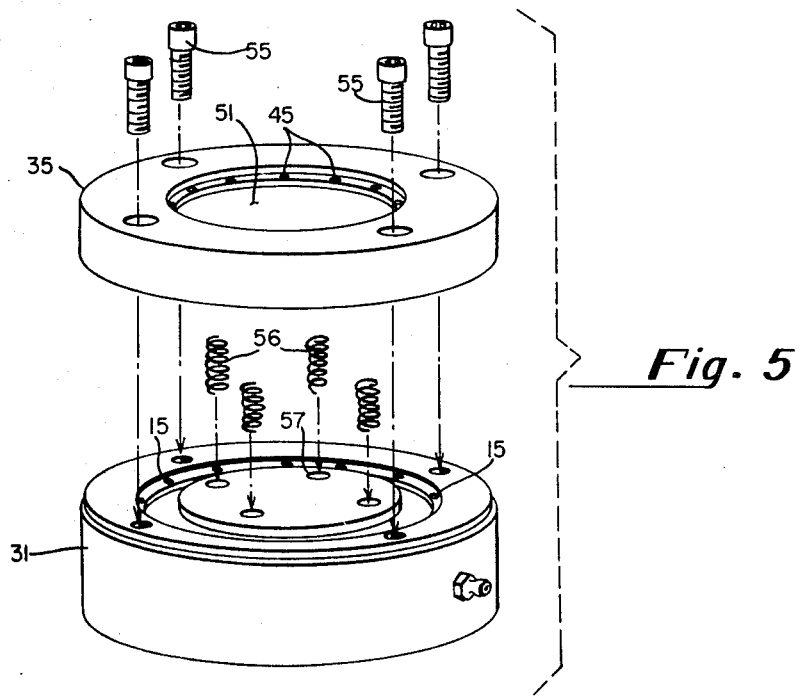
FIG. 5 is an exploded perspective view of certain parts of the lubricating equipment of FIG. 1 especially adapted for lubricating a bearing assembly of smaller size than the assembly of FIG. 1.

One of the features of the invention is that the equipment is adaptable for various size bearings through the use of inserts. For example, the frame of FIG. 3 can be provided with an insert which is mounted on the top disc and is adapted to receive a smaller size bearing assembly. This kind of construction is illustrated in FIGS. 5 and 6 where the disc 31 (or insert) mounts another insert 35 which supports the bearing assembly 26. The assembly is held in position by the hold-down mechanism 4.

The disc 31 has an annular shoulder 40 which receives the annular lip 41 on the insert 35. The engagement positions the insert laterally.

The bottom of the insert 35 has a groove 42 which forms a grease manifold. The manifold 42 is in communication with the passages 15 so as to receive grease therefrom.

The insert 35 has a support surface 43. On the support surface 43 is formed an annular groove 44. The insert has a plurality of vertically extending passages 45 which are connected between the manifold 42 and the groove 44. The passages 45 conduct grease from the manifold 42 to the groove 44.

Outboard of the groove 44 is a support surface 46 on which rests the cage 50 of the assembly 36.

Inwardly of the groove 44 is a cavity 51 which accepts the race 52 of the bearing assembly. The wall 53 of the cavity engages the outer wall 54 of the race and positions the assembly laterally so as to present the bearings 53 to the groove 44.

The base 30 and the disc 31 are held together in a manner previously described and the insert 35 is locked to the disc 31 by the screws 55.

With the arrangement of FIG. 6 it is preferred to use spring means between the disc 31 and the insert 35 in order to push the insert away from the disc when the screws 55 are released otherwise the grease in the manifold 42 exerts a restraining force on the insert and it is extremely difficult to remove the same.

While the spring means can take a variety of forms it is preferable to use four equally spaced springs 56 which are compressed in the cavities 57.

For the lubrication of smaller sized bearings and particularly those of different diameters, the invention contemplates an arrangement wherein the frame has multiple inserts, each insert being adapted to support a different size bearing.

Such an arrangement is shown in FIG. 7 wherein the frame 60 has a plurality of inserts 61, 62, 63, 64, 65 and 66. All of the inserts except 63 have the same construction as described in connection with the insert 35. For example, with reference to FIG. 9 the insert 66 has a grease manifold 70, a top area 71 having an annular groove 72, a plurality of vertically extending passages 73 connecting the manifold with the groove 72 and a cavity 74 adapted to receive the inner race of a bearing assembly and position the same laterally.

In connection with the groove 72 it will be observed that the groove is formed in the top area in a manner such that there is an annular wall 75. This wall is disposed between the groove and the inner race of a bearing assembly and operates to direct grease upwardly to the bearings similarly as the race walls 22 and 54 heretofore described.

The insert shown in FIG. 8 is of a special configuration for accepting the assembly 80 which comprises a cage 81 and ball bearings 82. The insert designated at 83 has a grease manifold 84 and passages 85 which communicate with the annular groove 86. The passages 85 conduct grease from the manifold into the groove 86 from whence the grease expands upwardly on and between the roller bearings 82. The manifold 84 is fed from the fitting 90 which is in communication of the manifold via passage 91. The plate 92 holds down the assembly 80.

In connection with the arrangement in FIG. 7, the invention contemplates that inserts which are not in use be protected from dust and dirt and the like. This protection takes the form of a cover 93 which fits over the insert and is held against lateral movement by the fact that the insert extends slightly upwardly from the frame (see FIG. 9).

It is to be noted that with the assembly of FIG. 7 each of the inserts has its own independent grease fitting and connecting passageways to the manifold similar to the fitting 90 and passageway 91.

Figure 3A:
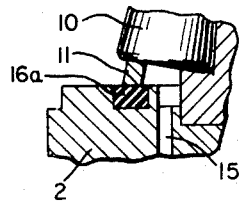
FIG. 3a is a fragmentary view of certain portions of FIG. 3.
Figure 4:
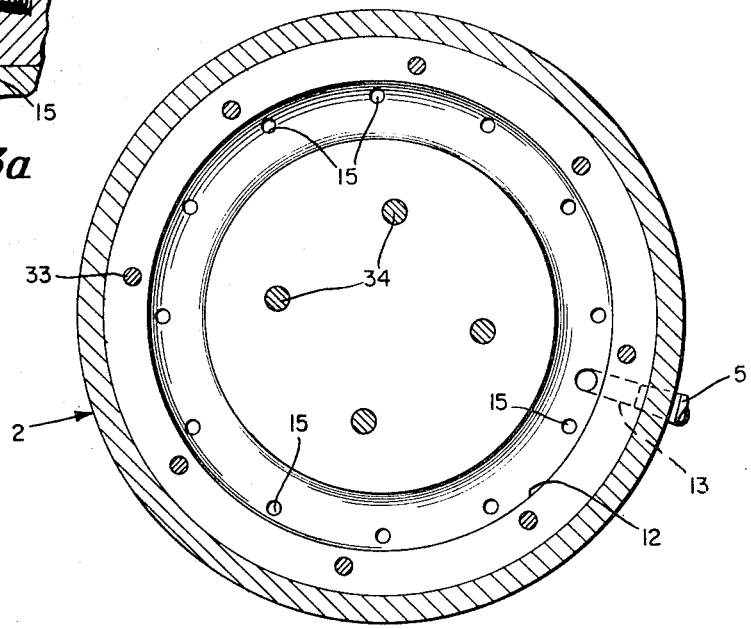
FIG. 4 is a view partially taken along the lines 4—4 of FIG. 3.

In the manufacturing of large bearing assemblies, it is not necessary that the wide end of the cage be provided with a machined or finished surface. Therefore, depending upon the size and method of manufacturing, the wide edge may have rough spots which will not permit the edge of the cage to lie flat against the support surface. With such irregularities the grease can squeeze out of the open space between the cage and support surface. To eliminate this the invention contemplates that the support surface be comprised of a yieldable material which will accomodate the irregularities. For example, in FIG. 3a I have shown the support surface to be formed of yieldable material 16a which is preferably of silicon or some other grease resisting, yieldable material.

In connection with large assemblies, I have found that where the manifold has a single grease fitting, the grease, in rising upwardly through the bearings, tends to favor the side adjacent the fitting. To overcome this, the invention contemplates that the manifold be provided with more than one grease fitting and that the fittings be commonly connected to the grease source. For example, this is done by hose connections to a pair of diametrically opposed fittings and with the central section of the hose connected back to the grease source. Alternatively, passages can be formed in the disc to interconnect the fittings and to make a connection with the grease source.

I claim:

1. Equipment for holding and supplying lubricating grease to tapered roller bearing assemblies, such an assembly including the inner race, the bearings and the cage, the equipment comprising:

a frame member having a top area;

means in said frame below said top area forming a grease manifold to receive grease from a source exterior to said frame;

an annular groove formed in said top area;

a plurality of passageways connected with said groove and with said manifold for conducting grease from the manifold to the groove;

means forming a support surface on said top area adjacent to and outboard of said groove to engage the cage of an assembly and support the assembly for lubrication or alternatively to engage and support an insert for holding a different size assembly;

a cavity inboard of said groove for use in accepting the inner race of an assembly mounted on the support surface, the wall of the cavity engaging the outerwall of the inner race of such an assembly whereby to position the assembly laterally and present the bearings of the assembly to said groove whereby to receive grease therefrom;

mechanism on said frame to fixedly hold an assembly mounted on said support surface or on said insert; and means on said frame for use in engaging an insert mounted on said support surface to position the same laterally.

2. Means for holding and supplying lubricating grease to different sized tapered roller bearing assemblies, such an assembly including the inner race, the bearings and the cage comprising:

a frame member having a top area;

means in said frame below said top area forming a grease manifold to receive grease from a source exterior said frame;

an annular groove formed in said top area;

a plurality of passageways connected with said groove and with said manifold for conducting grease from the manifold to the groove;

means forming a support surface on said top area adjacent to and outboard of said groove to engage the cage of an assembly of given size and support the assembly for lubrication or alternatively to support an insert for holding an assembly of different size;

a cavity inboard of said groove to accept the inner race of said given size assembly mounted on the support surface whereby to position the assembly laterally to present its bearings to said groove whereby to receive grease therefrom;

an insert mounted on said support surface;

screw means securing said insert to said frame member;

spring means connected between said insert and said frame and operative when said screw means are loosened to push the insert away from said frame member;

a top area on said insert;

means in said insert below the top area thereof forming a grease manifold in communication with said annular groove to receive grease therefrom;

an annular groove formed in insert top area;

a plurality of passageways in the insert connected with the insert groove and with the insert manifold for conducting grease from the manifold to the groove;

a support surface on the insert top area adjacent to and outboard of insert groove to engage the outer cage of a different size assembly; and a cavity inboard of said insert groove to accept the inner race of said different size assembly mounted on the insert support surface whereby to position the assembly laterally to present its bearings to said groove to receive grease therefrom.

3. Equipment for holding and supplying lubricating grease to tapered roller bearing assemblies, such an assembly including the inner race, the bearings and the cage, the equipment comprising:

a frame member;

a plurality of insert cavities formed on the top of the frame;

a plurality of grease fittings on said frame member;

a plurality of passageways respectively connecting said fittings and said cavities;

a plurality of bearing inserts respectively disposed in said cavities, the inserts being constructed respectively to support different size assemblies;

for each insert, means for securing the same in its cavity and each insert being constructed as follows:

a top area;

means in the insert below said top area forming a grease manifold to receive grease from its cavity;

an annular groove formed in said top area;

a plurality of passageways connected with said groove and with said manifold for conducting grease from the manifold to the groove;

means forming a support surface on said top area adjacent to and outboard said groove to engage the cage of an assembly and support the assembly for lubrication;

a cavity inboard of said groove to accept the inner race of an assembly mounted on the support surface, the wall of the cavity engaging the outer wall of the inner race to position the assembly laterally to present said bearings to said groove to receive grease therefrom; and mechanism on said frame to fixedly hold an assembly being lubricated.

4. A construction in accordance with claim 3 wherein said insert cavities are disposed in a circular fashion in said frame and said mechanism is located centrally of the cavities and constructed for selective engagement with assemblies disposed in the cavities.

5. A construction in accordance with claim 3 wherein said cavities are arranged in a circular fashion and said mechanism comprises a post located centrally of the cavities and connected to and extending upwardly to said frame, an arm rotatably mounted on the post and a vertically moveable plate on the arm constructed to engage an assembly mounted on an insert and hold the assembly during the lubricating operation.

6. Equipment for holding and supplying lubricating grease to a tapered roller bearing assembly, the assembly including the inner race, the bearings and the cage, the equipment comprising:

a frame member having a top area;

means in said frame below said top area forming a grease manifold to receive grease from a source exterior said frame;

an annular groove formed in said top area;

a plurality of passageways connected with said groove and with said manifold for conducting grease from the manifold to the groove;

means forming a support surface on said top area adjacent to and outboard of said groove to engage the cage of an assembly and support the assembly for lubrication;

a cavity inboard of said groove to accept the inner race of an assembly, mounted on the support surface, the wall of the cavity engaging the outer wall of the inner race to position the assembly laterally and present said bearings to said groove whereby to receive grease therefrom, said assembly being positioned laterally so that the outer wall of the inner race extends partially across said groove and is operative to direct grease from the groove upwardly into the bearings; and mechanism on said frame to fixedly hold as assembly being lubricated.

7. Means for holding and supplying lubricating grease to different sized roller assemblies, such an assembly including the inner race, the bearings and the cage comprising:

a frame member having a top area;

support means formed on said top area for use in mounting inserts of different sizes for respectively holding bearing assemblies of different sizes;

means in said frame below said top area forming a grease manifold to receive grease from a source exterior said frame;

grease supply groove formed in said top area;

passageway means connected to said supply groove means and with said manifold for conducting grease from the manifold to the groove means;

a plurality of inserts alternatively mountable on said support means and one insert being mounted on the support means;

screw means scuring said insert to said frame member;

spring means connected between said insert and said frame and operative when said screw means are loosened to push the insert away from said frame member;

a top area on said insert;

means in said insert below the top area thereof forming a grease manifold in communication with said supply means to receive grease therefrom;

an annular groove formed in the insert top area;

a plurality of passageways in the insert connected with the annular groove and with the insert manifold for conducting grease from the manifold to the annular groove;

means forming a support surface on the insert top area adjacent to and outboard of the annular groove to engage and support the cage of a bearing assembly; and a cavity inboard of said annular groove to accept the inner race of a bearing assembly mounted on the insert support surface whereby to position the assembly laterally to present its bearings to said annular groove to receive grease therefrom.

8. Means for holding and supplying lubricating grease to different sized roller bearing assemblies, such an assembly including the inner race, the bearings and the cage comprising:

a frame member having a top area;

support means formed in said top area for use in mounting inserts of different sizes for respectively holding bearing assemblies of different sizes;

means in said frame below said top area forming a grease manifold to receive grease from a source exterior said frame;

grease supply means including an annular groove formed in said top area;

passageway means connected with said supply groove means and with said manifold for conducting grease from the manifold to the groove means;

means forming a support surface on said top area adjacent to and outboard of at least part of said supply groove means;

a plurality of inserts alternatively mountable on said support means and one being mounted on the support means;

a top area on said insert;

means in said insert below the top area thereof forming a grease manifold in communication with said supply groove means to receive grease therefrom;

an annular groove formed in the insert top area;

a plurality of passageways in the insert connected with the annular groove and with the insert manifold for conducting grease from the manifold to the annular groove;

a support surface on the insert top area adjacent to and outboard of the annular groove to engage and support the cage of a bearing assembly; and a cavity inboard of said annular groove to accept the inner race of a bearing assembly mounted on the insert support surface whereby to position the assembly laterally to present its bearings to said annular groove to receive grease therefrom.

9. Means for holding and supplying lubricating grease to different sized roller bearing assemblies, such an assembly including the inner race, the bearings and the cage comprising:

a frame member including a top area;

support means formed on said top area for use in mounting inserts of different sizes for respectively holding bearing assemblies of different sizes;

grease supply means formed in said top area;

a plurality of inserts alternatively mountable on said support means and one being mounted on the support means;

a top area on said insert;

means in said insert below the top area thereof forming a grease manifold in communication with said grease supply means to receive grease therefrom;

an annular groove formed in the insert top area;

a plurality of passageways in the insert connected with the annular groove and with the insert manifold for conducting grease from the manifold to the annular groove;

means forming a support surface on the insert top area adjacent to and outboard of the annular groove to engage and support the cage of a bearing assembly; and a cavity inboard of said annular groove to accept the inner race of a bearing assembly mounted on the insert support surface whereby to position the assembly laterally to present its bearings to said annular groove to receive grease therefrom.

10. Means for holding and supplying lubricating grease to different sized roller bearing assemblies, such an assembly including the inner race, the bearings and the cage comprising:

a frame member;

support means formed on said frame for use in mounting inserts of different sizes for respectively supporting bearing assemblies of different sizes;

grease supply means formed in said frame member;

a plurality of inserts for use on said frame, one insert being mounted on the support means;
a top area on said insert;
means in said insert below the top area thereof forming a grease manifold in communication with said grease supply means to receive grease therefrom;
an annular groove formed in the insert top area;
a plurality of passageways in the insert connected with the annular groove and with the insert manifold for conducting grease from the manifold to the annular groove;
means forming a support surface on the insert top area adjacent to and outboard of the annular groove to engage and support the cage of a bearing assembly; and
a cavity inboard of said annular groove to accept the inner race of a bearing assembly mounted on the insert support surface whereby to position the assembly laterally to present its bearings to said annular groove to receive grease therefrom.

11. Equipment for holding and supplying lubricating grease to tapered roller bearing assemblies, such an assembly including the inner race, the bearings and the cage, the equipment comprising:
a frame member having a top area;
means in said frame below said top area forming a grease manifold to receive grease from a source exterior to said frame;
an annular groove formed in said top area;
a plurality of passageways connected with said groove and with said manifold for conducting grease from the manifold to the groove;
means forming a support surface on said top area adjacent to and outboard of said groove to engage the cage of an assembly and support the assembly for lubrication or alternatively engage and support an insert for holding a different size assembly;
a cavity inboard of said groove for use in accepting the inner race of an assembly mounted on the support surface, the wall of the cavity engaging the outerwall of the inner race of such an assembly whereby to position the assembly laterally and present the bearings of the assembly to said groove whereby to receive grease therefrom; and
mechanism on said frame to fixedly hold an assembly mounted on said support surface or on said insert.

12. Means for holding and supplying lubricating grease to bearing assemblies comprising:
a frame member;
support means formed on said frame for use in mounting inserts of different sizes for respectively supporting bearing assemblies of different sizes;
grease supply means formed in said frame member;
a plurality of inserts for use on said frame, one insert being mounted on the support means and the other inserts being alternatively mountable on the support means;
a top area on said one insert;
means in said one insert below the top area thereof forming a grease manifold in communication with said grease supply means to receive grease therefrom;
an annular groove formed in said one insert top area;
a plurality of passageways in said one insert connected with the annular groove and with the insert manifold for conducting grease from the manifold to the annular groove; and
means forming a support surface on said one insert top area adjacent to and outboard of the annular groove to engage and support a bearing assembly for lubrication.

13. Equipment for holding and supplying lubricating grease to a bearing assembly, the equipment comprising:
a frame member having a top area;
means in said frame below said top area forming a grease manifold to receive grease from a source exterior said frame;
an annular groove formed in said top area;
a plurality of passageways connected with said groove and with said manifold for conducting grease from the manifold to the groove;
means forming a support surface on said top area adjacent and outboard of said groove to engage and support the assembly for lubrication; and
a cavity inboard of said groove to accept the inner race of an assembly, mounted on the support surface, the wall of the cavity engaging the outer wall of the inner race to position the assembly laterally and present said bearings to said groove whereby to receive grease therefrom.

14. Means for holding and supplying lubricating grease to bearing assemblies comprising:
a frame member;
support means formed on said frame for use in mounting inserts;
grease supply means formed in said frame member;
a plurality of inserts for use in lubricating bearing assemblies, one insert being mounted on the support means and the other inserts being alternatively mountable on the support means;
a top area on said one insert;
means in said one insert below the top area thereof forming a grease manifold in communication with said grease supply means to receive grease therefrom;
an annular groove formed in said one insert top area;
a plurality of passageways in said one insert connected with the annular groove and with the insert manifold for conducting grease from the manifold to the annular groove; and
means forming a support surface on said one insert top area adjacent to and outboard of the annular groove to engage and support a bearing assembly, or alternatively to engage and support another insert.

* * * * *